July 17, 1934.  R. B. COLT  1,966,850
DRIFT ANGLE INDICATOR
Filed July 21, 1932   2 Sheets-Sheet 1
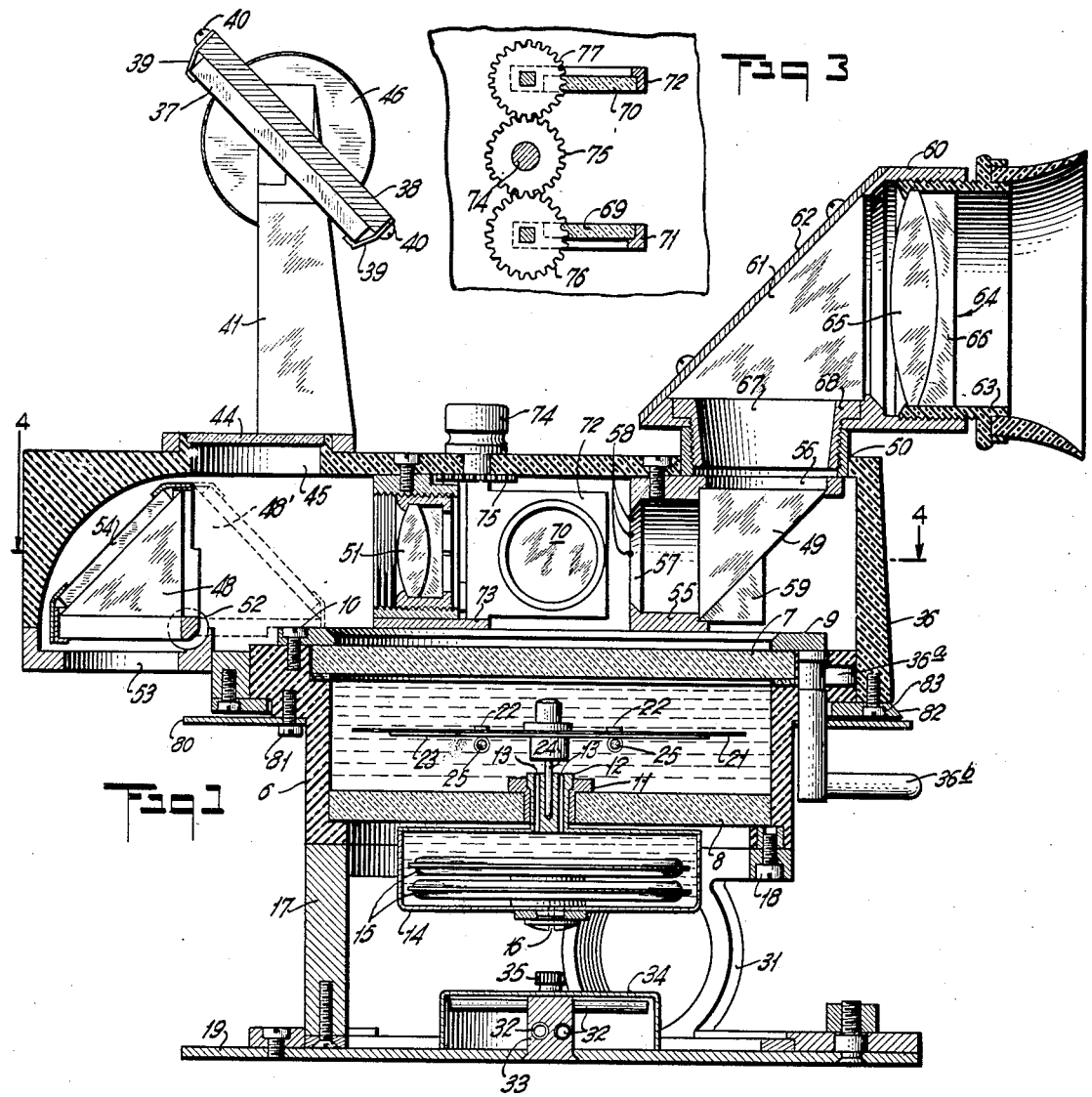
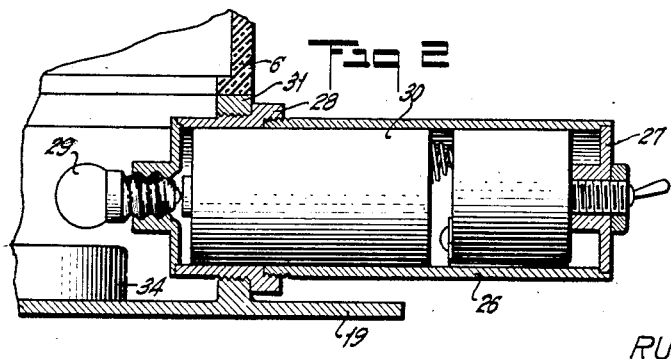
INVENTOR.
RUTGER B. COLT.
BY Stephen Cerstvik.
ATTORNEY.

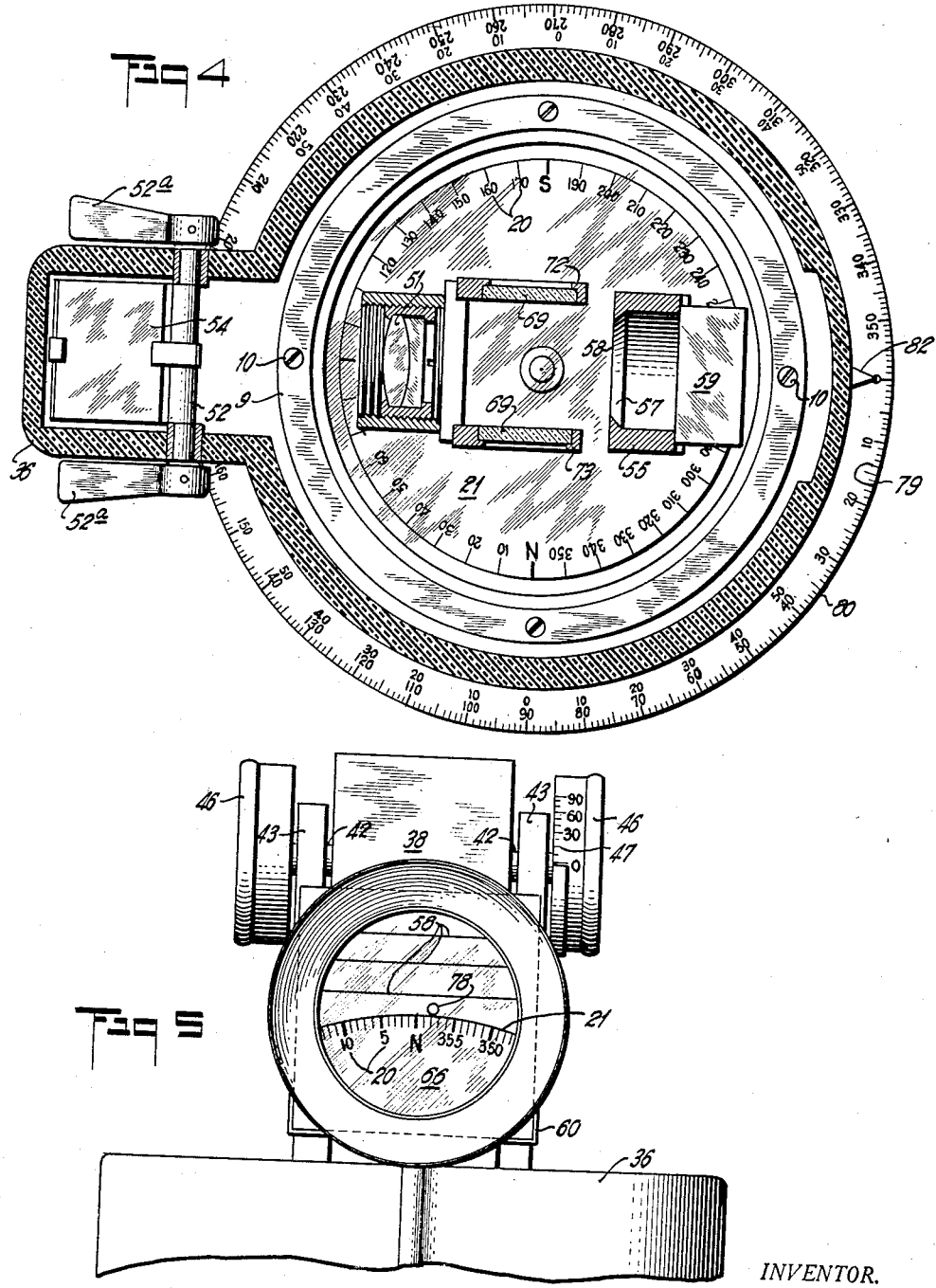

Patented July 17, 1934

1,966,850

UNITED STATES PATENT OFFICE 1,966,850

DRIFT ANGLE INDICATOR

Rutger B. Colt, Elizabeth, N. J., assignor to Bendix Aviation Corporation, South Bend, Ind., a corporation of Delaware Application July 21, 1932, Serial No. 623,857

14 Claims. (Cl. 88—2.7)

The present invention relates to navigational instruments, and more particularly to a combined instrument for determining the azimuth or bearing of an object and also the drift of an aircraft.

One of the objects of the invention is to provide a novel instrument for readily and accurately taking bearings of objects and for determining the drift of an aircraft on which the instrument is employed.

Another object is to provide a novel combined azimuth compass and drift indicator wherein an enlarged field of view is substituted for the line of sight heretofore required.

Another object is to provide an instrument employing means for taking the bearing of an object and for determining the drift of an aircraft on which the instrument is mounted, which is so constructed and arranged that the observer is enabled to determine the drift and to take bearings in all directions as well as above and below the horizon without shifting the position of his eye.

Another object is to provide a novel instrument which is so constructed and arranged that an observer may simultaneously view, in the same field, images of the object of which it is desired to take a bearing and of a portion of a compass card against which the bearing is to be measured, and also an image of a reference means with which the apparent movement of images of objects on the ground is correlated whereby the drift of the craft carrying the instrument may be determined.

Another object is to provide a novel azimuth and drift indicating instrument embodying an optical system whereby bearings of illuminated objects, such as celestial objects, as well as drift, may be obtained at night.

Still another object of the invention is to provide in an instrument of the class described and including a compass card, a novel optical system whereby the angular magnification of images of objects whose bearing is to be determined is equal to the angular magnification of the compass card.

A further object is to provide a novel combined drift indicator and azimuth compass embodying an optical system for producing in the same field of view images of the objects of which it is desired to take a bearing and also of a portion of a compass card against which such bearing is to be measured as well as an image of a reference means against which apparent movement of images of objects on the ground is correlated for determining the drift, said optical system being so constructed and arranged that the angular magnification of the images of the object and of the compass card are substantially equal, whereby the position of the image of the object against the image of the card along the periphery of the latter and the correlation of the apparent movement of the images of ground object against the image of the reference means provides a method of determining the drift and also gives a direct and accurate reading of the bearing of an object.

A still further object is to provide a novel aircraft drift indicator embodying an optical system whereby images of ground objects and of a reference against which said ground images are correlated, are produced in the same field of view.

The above and further objects and novel features of the invention will appear more fully hereinafter from a consideration of the detailed description which follows when taken in connection with the accompanying drawings wherein one embodiment of the invention is illustrated. It is to be expressly understood however, that the drawings are for the purpose of illustration and description only and are not designed as a definition of the limits of the invention, reference being had for this purpose to the appended claims.

In the drawings, wherein like reference characters refer to like parts throughout the several views, Fig. 1 is a side elevation partly in section of one form of instrument embodying the present invention;

Fig. 2 is a partial detail section of the arrangement of illuminating means whereby the instrument may be used at night;

Fig. 3 is a partial detail view of the color screens employed in the instrument for preventing glare when taking bearings of the sun.

Fig. 4 is a cross sectional view taken on line 4—4 of Fig. 1; and

Fig. 5 is an end view of the instrument as seen from the right in Fig. 1 showing an example of the observer's field of view.

Referring now to the drawings, and more particularly to Fig. 1 wherein one embodiment of the present invention has been illustrated employing a magnetic compass, constituted by a bowl 6 which is hermetically sealed at the top and bottom by means of a pair of transparent, preferably glass, plates 7 and 8. Top plate 7 is held in place by a ring 9 which engages the outer edge of the plate and is secured to the top of the bowl 6 in any suitable manner, as for example by screws, one of which is shown at 10. Bottom plate 8 rests on a shoulder formed at the bottom of the bowl 6 and is provided at its center with an opening within which is located a bushing 11 having an inner member 12 which forms a support for the compass card, as will appear more fully hereinafter. Member 12 is provided with a pair of openings 13 by means of which the interior of the bowl 6 communicates with an auxiliary compartment 14 secured to or formed integral with the member 12 so that a suitable damping liquid which fills the bowl 6 also fills the compartment 14. Mounted within the auxiliary chamber 14 are a pair of expansible diaphragms 15, the interior of which is in communication with the atmosphere through an opening 16. The purpose of the expansible diaphragms is to permit expansion and contraction of the liquid confined within the bowl 6, said liquid being provided for the purpose of damping the compass card. The bowl 6 is secured to a suitable stand 17 by means of screws 18, only one of which is shown, the stand 17 in turn being secured to a base or platform 19.

It is desirable that the instrument be adapted for both day and night use, and for this purpose novel direction indicating means are provided. As illustrated, such means consist of an indicating dial 20 (Fig. 4) on a compass card 21 centrally positioned within the bowl 6 and secured by means of rivets 22 to the upper surface of a circular plate 23 which is pivotally mounted at its center on a pivot post 24 which in turn is carried by the member 12. Card 21 is of greater diameter than plate 23 so that the circumferential edge of the card extends beyond the periphery of said plate and is made of some suitable opaque material having transparent graduations thereon whereby said graduations may be made visible upon the passage of light therethrough. This may be accomplished by employing a photographic negative of a compass card. There are preferably four of the rivets 22 equally spaced about the center of card 21 and having eyelets formed in the lower ends thereof for supporting a pair of compass needles or bar magnets 25 parallel to the north-south line of the compass. Magnets 20 will then tend to hold the card in a fixed position relative to the earth's magnetic poles.

Illuminating means are provided for rendering it possible to transmit, through reflecting prisms or mirrors, a clear and distinct image of the scale 20 on the compass card 21. Such means, as shown, comprise a flashlight composed of a battery casing 26 having one end thereof closed as shown at 27 and its other end closed by a cap 28 which form a lamp mounting for an electric light bulb 29. A dry cell 30 is provided within the casing 26 and arranged to contact with the base of the bulb 29 in the usual manner. The cap 28 is threaded externally whereby the entire unit, including the casing 26 and the light bulb 29 may be secured to a ring 21 formed integral with the stand 17 so that the light bulb 29 projects into the space under the transparent bottom plate 8 of the compass bowl 6, thereby passing light through the plate 8 and the graduations on the compass card 21. A compass compensator is also provided for correcting the compass for deviation, said compensator being constituted by four or more adjustable bar magnets 32 arranged in two pairs at right angles to each other, carried by a support 33 secured to the base 19 and enclosed by a cover 34 secured to the member 33 as by means of a thumb screw 35.

Novel means are provided, in combination with the above described compass, for forming an image of a distant object (generally considered in optics to be at infinity) together with an image of a portion of the compass card in the same field of view where the two may be simultaneously and adjacently observed. In the form shown, such means are constituted by a novel alidade consisting of a system of mirrors, prisms and lenses mounted in a suitable housing 36 which is adapted to be rotated about the axis of the compass bowl and then locked in any desired position by means of a cam 36a operated by a lever 36b. The novel alidade is so constructed and arranged, as will be pointed out more fully hereinafter, that the angular magnification of the image of the object whose bearing is to be determined, is substantially equal to the angular magnification of the image of the portion of the compass card which is viewed when taking a bearing of said object.

For the purpose of directing an image of an object into the instrument irrespective of the depression or elevation of said object with respect to the observer, and for the purpose of availing the observer with a comparatively large field of view, there is provided a reflector which is adapted to be swung about a horizontal axis. In the form shown, the reflector consists of a mirror 37 secured to a member 38 by means of a plurality of circumferentially spaced fingers 39 which are fastened to the member 28 in any suitable manner, as by means of screws 40.

The above described mirror assembly is rotatably supported in journals formed on top of vertically extending arm of a U-shaped bracket 41 by means of a pair of axles 42 extending laterally from member 38 and rotatably maintained on the arms of said bracket by bearing covers 43. Bracket 41 is secured to the housing 36 by suitable screws in a position such that a glass covered opening 44 in the lower central portion of the bracket registers with an opening 45 formed in the top of the housing 36. Preferably the axis of rotation of mirror 37 is in a vertical plane slightly inward of the center of opening 45 towards the center of the compass card and parallel to a line which is perpendicular to a radius drawn from the vertical axis of the housing 36 through said opening so that images of objects reflected by the mirror will appear, preferably, in the upper half of the field of view, as will be apparent from Fig. 5. A pair of knobs 46 are secured to the outer ends of axles 42 for turning mirror 37 to the desired position, said mirror being held in adjusted position by suitable friction means, if desired. A suitable scale 47 is provided on the periphery of one of the knobs 46 (Fig. 5) for indicating the angular position of mirror 37 with respect to the horizon.

Optical means are provided for transmitting the image reflected by mirror 37 to the same field of view as the image of the compass card and, in the form illustrated, such means comprise a pair of diametrically disposed reflecting prisms 48 and 49 located beneath opening 45 and a similar opening 50, respectively, and an objective lens 51 interposed between said prisms. In order to obtain equal angular magnification of the images of the object and of the compass card, the focal length of the objective lens 51 is made substantially equal to the radius of the compass card 21, thus the angular magnification of the images formed by the objective lens is equal to the angular values of the compass card when observed in the same field of view. Angular magnification may be defined as the ratio of the tangent of the angle of subtense (taken from the optical axis as the fixed reference line) of the image presented to the eye by the instrument, to the tangent of the angle under which the object would be seen by the naked eye. It is desirable to have such equal angular magnification of both images in order that an angle of 1° subtended on the horizon will be equal to 1° on the image of the compass card, thus enabling an observer to obtain a direct reading of bearings by merely noting the position of the image of the object with respect to the image of the compass card. Prism 48 is hinged at 52 so that it may be rotated through an angle of 90° by means of either of the levers 52a (Fig. 4) to the position shown in dotted lines at 48' and when it is in the position shown in full lines in Fig. 1 it registers with an opening 53 formed in the bottom of housing 36 and through which objects on the ground may be viewed and images thereof reflected by the inside of the hypotenuse face of the prism for the purpose of determining drift as will be pointed out more fully hereinafter. On the other hand, when the prism is in the position shown in dotted lines the light rays entering the prism from mirror 37 will be reflected at right angles from the vertical by a mirror 54 carried on the hypotenuse face of prism 48. Prism 49 is supported in a member 55 by means of grooves into which the corners of said prism are adapted to slide, said member 55 having an opening 56 which coincides with opening 50, and an opening 57 through which rays from the objective lens 51 may enter prism 49 which directs them vertically upward through opening 56. A series of horizontal wires 58 are secured to the member 55 across the upper portion of the opening 57, the images of which serve as a reference mark for determining the drift as will appear later.

Means are provided for causing the light rays which pass through the bottom plate 8 and the graduations on compass card 21, to continue to pass vertically upward through prism 49 and opening 56 and, in the form illustrated, such means are constituted by a small right angle prism 59 having its diagonal face cemented to the lower half of prism 49. Light rays from both the object and the compass card are thereby brought into the same field of view through opening 56.

Due to the fact that an observer is often in cramped quarters, such as in an aeroplane, it is desirable to provide means whereby the images developed by the above-described optical system may be viewed from any desired point about the instrument irrespective of the azimuth of the object observed. Such means, as herein illustrated, consist of a housing member 60, one portion of which is triangular in shape for receiving a right angle reflecting prism 61 adapted to reflect vertical rays into a horizontal plane. A suitable plate 62 secured to member 60 by means of screws is provided for holding prism 61 in place. The portion of member 60 adjacent the vertical face of prism 61 is provided with an opening into which the lens holder 63 is threaded, the latter having a field lens 64 mounted therein for focusing the rays reflected by prism 61, said field lens consisting of a double convex lens 65 and a plano-concave lens 66 cemented together. The base of housing 60 is provided with an opening 67 directly below prism 61 and the entire unit is rotatably mounted on housing 36 by means of a hollow flange member 68 which extends downwardly through said opening and is held in place by the threaded wall of opening 50. Member 60 may thereby be rotated about a vertical axis passing through the center of opening 50 and may be turned to suit the position of the observer's eye irrespective of the azimuth of the observed object. The optical system is also so designed that the exit pupil thereof is about one foot away from the field lens 64 in order that the observer need not be compelled to bring his eye close up to said field lens but may easily note the reading from a distance of substantially one foot therefrom as illustrated in Fig. 5.

It is nearly always necessary when observing the sun to use some means for eliminating the glare or blinding effect of the sun's rays. Suitable colored glasses 69 and 70 (Figs. 1 and 4) are provided for this purpose and as shown, these glasses are secured in frames 71 and 72, respectively, either of which is adapted to be swung into the path of the light rays as the latter emerge from the lens 51. The axis about which frames 71 and 72 are adapted to be swung are near one edge thereof and are interposed between the upper wall of housing 36 and a plate 73 mounted on the top of the compass bowl. For swinging said frames about their axis there is provided a knob 74 projecting through the upper wall of and into the housing 36 and having a spur gear 75 (Fig. 4) operatively attached thereto. The gear 75 engages spur gears 76 and 77 which are diametrically disposed relative thereto and are secured to the axes of frames 71 and 72 respectively. When knob 74 is turned clockwise then glass 69 will swing in front of lens 51, whereas a counterclockwise rotation will swing glass 70 before said lens.

When it is desired to measure the azimuth or take the bearing of an object it is only necessary to turn the entire alidade unit about its vertical axis until the optical axis of the system points toward the observed object, that is until the axis of reflector 37 is substantially perpendicular to light rays entering the same from the object and to adjust member 60 about its vertical axis to suit the position of the eye. Reflector 37 is then turned about its horizontal axis by means of knobs 46 until an image of the object is reflected vertically downward through glass 44 and opening 45 on to the reflecting surface 54 of prism 48 when the latter is in the position shown in dotted lines. The light rays striking the reflecting surface 54 are turned through 90° and directed through lens 51 (and either one or the other of glasses 69 and 70 if the latter are used) to the upper half of prism 49 which turns the rays through 90° reflecting them vertically upward. At the same time light rays from lamp 29 are reflected upwardly through the transparent wall 8, compass card 21, plate 7, prism 59 and lower half of prism 49, no rays from the lamp being permitted to illuminate the portion of the field in which the object image appears, images of the observed object and of the compass card being thus brought into the same field of view, the rays of each enter prism 61 which turns them through 90°. Both images, by virtue of the focal length of lens 51, are thereby magnified to such an extent that the angular magnification of the image of the object is equal to the angular values of the compass card when viewed through the field lens 64 and are then reflected to the eye of the observer who may be substantially one foot away from the instrument. Reflector 37 may be adjusted until an image 78 (Fig. 5) of the object as seen through lens 64 is immediately adjacent the image of the compass card and the position of the same with respect to the latter will give a direct and accurate reading of the bearing without reference to any other fiducial than the compass card itself. For example, as shown in Fig. 5, the bearing of the object which appears as image 78 is shown to be 359°. As long as the object appears somewhere in the field of view of the instrument its magnetic azimuth can be taken by turning reflector 37 so as to bring the image of the object in close proximity to the image of the compass card 21 which is simultaneously visible through the field lens 64.

When it is desired to determine the drift of the aircraft on which the instrument is mounted, the prism 48 is rotated to the position shown in Fig. 1 so as to cover opening 53, thereby directing light rays into the instrument from objects seen on the ground to form images thereof, which images are reflected by the inner diagonal face of prism 48 and caused to pass through lens 51 and then through prisms 49 and 61 so that these images may be viewed through the field lens 64 in the same manner as images of objects when a bearing is taken. These images of objects on the ground will appear to be moving due to the motion of the craft with respect to the ground, and since images of the cross hairs or wires 58 are also formed in the same field of view as the images of the objects, the latter may be correlated with respect to said cross hairs by rotating the housing 36, and hence prism 48 about the vertical axis of compass card 21. The apparent motion of the objects on the ground may be made to appear parallel to the cross wires, at which time the horizontal optical axis of the alidade is at an angle to the transverse of the aircraft. This angle may then be read from a scale 79 etched on an azimuth ring 80 (Fig. 4) which is concentric with and secured to the compass bowl 6 in any suitable manner as by means of screws 81. The reading may be obtained by noting the position of index member 82 with respect to the scale, said member being secured to the bottom of housing 36 as by means of a screw 83. The parallelism of the ground objects and the cross hairs 58 could also be accomplished by turning said cross wires in the focal plane of the alidade and measuring the angle through which the wires were turned.

There is thus provided a novel azimuth compass and drift indicator which enables an observer to readily and accurately obtain the azimuth of an object which is located either above or below the horizon, and one which enables the observer to take bearings in any direction without shifting the position of his eye. Thus an observer in cramped quarters, such as in an aeroplane, may take bearings with perfect ease.

A novel combination of elements is also provided whereby an image of the object, the azimuth of which it is desired to measure, is brought into close proximity with a virtual image of a suitable graduated scale, such as a compass card, against which the azimuth measurement is made, making said images simultaneously visible in a common field of view and making the angular magnification of said images substantially equal so that the image of the object against which the image of the compass card gives direct and correct reading of the bearing of the object.

Novel means are also provided whereby objects on the ground may be viewed through the same alidade and an image of means for correlating the apparent movement of said objects is brought into the same field of view, whereby the drift of the aircraft on which the instrument is mounted may be determined.

Although only one form of the invention has been illustrated and described it is to be expressly understood that the same is not limited thereto but that various changes, which will now appear to those skilled in the art, may be made in the mechanical form and in the arrangement of parts thereof. For example, any type of compass may be employed in lieu of the magnetic compass illustrated, and the term "movable compass card" as employed in the claims is of sufficient scope to cover a scale graduated in degrees, such as a pelorus scale. Various other changes may be made in the design and arrangement of parts shown without departing from the scope of the invention.

What is claimed is:

1. In an azimuth compass having a movable compass card and an optical system for producing in the same field of view an image of the card and an image of an object whose bearing is to be determined, alternate means in said system for producing in said same field of view images of objects on the ground, and an image of a reference means against which said ground images may be correlated to determine the drift of an aircraft carrying the instrument, and means for indicating the direction of said drift.

2. In combination, an azimuth compass having a movable compass card, an optical system adapted to produce in the same field of view an image of the object whose bearing is to be determined, an image of the compass card, and alternating an image of ground objects and an image of a reference means, whereby in one instance the position of the image of the first object against the image of the card gives an indication of the azimuth of said object, and in another instance the correlation of the apparent motion of the images of the ground objects with the image of the reference means determines the drift of the aircraft carrying the instrument, and means for indicating the direction of said drift.

3. A combined azimuth compass and drift indicator having a compass card, reference means, and a common optical system for determining the bearing of an object and the drift of an aircraft carrying the instrument by the compass card and reference means, respectively, said system including means for reflecting, in alternate positions thereof, light rays from the object whose bearing is to be determined and from other objects the apparent movement of which is employed to determine the drift.

4. In apparatus of the class described, a graduated movable compass card, illuminating means for said card, means for producing an image of a portion of said card, a rotatable reflector for reflecting an image of a distant object, means for producing images of objects on the ground, reference means against which the apparent motion of the ground objects is correlated to determine drift, and means for alternately transmitting said object image and said ground images to a common field of view with said card image and with an image of said reference means, respectively.

5. The combination with a compass having a movable compass card, of a reflector, an optical system rotatable about a vertical axis, means for moving said reflector about a horizontal axis for reflecting into said system an image of an object whose bearing is to be determined, reference means, and means in said system for producing images of ground objects and of said reference means for determining drift, said system including means adjustable in such a manner that in one position thereof said object image and an image of said compass card will appear in the same field of view and will have their angular magnifications substantially equal, and in another position of said means said ground objects and said reference means will appear in said same field of view.

6. The combination with a compass having a movable compass card, of reference means, an optical system rotatable about a vertical axis passing through the center of said card, a portion of said system being also rotatable about an axis parallel to said first-named axis, said latter portion being arranged to receive an image of said card and an image of said reference means, a reflector rotatable about a horizontal axis for reflecting into said system an image of an object whose bearing is to be determined, means for producing images of objects on the ground for correlation thereof against the image of said reference means to determine drift, and means in said system for alternately reflecting said object image and said ground images into a common field of view with said card image and reference image, respectively.

7. The combination with a compass having a movable compass card, of reference means, an optical system rotatable about a vertical axis passing through the center of said card, a portion of said system being also rotatable about an axis parallel to said first-named axis, said latter portion being arranged to receive an image of said card and of said reference means, a reflector rotatable about a horizontal axis for reflecting into said system an image of an object whose bearing is to be determined, another adjustable reflecting means for transmitting, in one position thereof, said object image to the same field of view with said card image and in another position for reflecting images of objects on the ground for correlation thereof against the image of said reference means for determine drift, and means in said system for producing said images in the same field of view at the respective times.

8. An instrument for measuring the azimuth of objects and the drift of an aircraft carrying said instrument, comprising a movable compass card, means for reflecting an image of an object along a given line irrespective of the position of said object, adjustable means so arranged that in one position thereof said object image is transmitted to the same field of view of an image of a portion of said compass card and in another position images are produced of objects on the ground, reference means, means for also producing in the same field of view an image of said reference means, and means including a rotatable optical system for reflecting said field of view in any direction whereby the azimuth of said first object may be measured against said compass card and alternately the apparent motion of said ground objects correlated against said reference means for determining the drift.

9. In an instrument wherein the azimuth of an object is adapted to be measured by reference to a compass of the type employing a compass card and wherein the drift of an aircraft carrying the instrument is adapted to be measured by correlating the apparent motion of objects on the ground with a reference means, the combination with said compass of a reflector, means for moving said reflector in a circle about a vertical axis passing through the center of said card, means for rotating said reflector about a horizontal axis, adjustable means associated with said reflector and so arranged that in one position said means reflect into the instrument from said reflector an image of an object whose bearing is to be determined and in another position reflect images of objects on the ground, and optical means for alternately transmitting said ground images and said object image to a common field of view with images of said reference means and of the portion of said compass card, respectively.

10. In an instrument wherein the azimuth of an object is adapted to be measured by reference to a compass of the type employing a compass card and wherein the drift of an aircraft carrying the instrument is adapted to be measured by correlating the apparent motion of objects on the ground with a reference means, the combination with said compass, of a reflector, means for moving said reflector in a circle about a vertical axis passing through the center of said card, adjustable means associated with said reflector and so arranged that in one position said means reflect into the instrument from said reflector an image of an object whose bearing is to be determined and in another position reflect images of objects on the ground, optical means for alternately transmitting said ground images and said object image to a common field of view with images of said reference means and a portion of said compass card, respectively, and means including a rotatable optical system for reflecting said field of view in any direction.

11. An azimuth alidade adapted to be rotatably mounted on a compass of the type employing a movable compass card and comprising a reflector for reflecting an image of an object vertically downward, means associated with said reflector and so arranged that in one position said means reflect said object image horizontally and in another position reflect, in the same direction, images of objects on the ground, reference means the image of which is adapted to be correlated against the images of the ground objects for determining drift, means for alternately reflecting said ground images and said object image into a common field of view with images of said reference means and a portion of said compass card, respectively, and means for reflecting said field of view in any horizontal direction.

12. The combination with a compass of the type employing a movable compass card for indicating direction, of an alidade adapted to be rotatably mounted on said compass, and comprising a reflector rotatable about a horizontal axis for reflecting object images in a given direction irrespective of the altitude or depression of an object, reflecting prisms for directing said images to a field of view common to that of an image of a portion of said compass card which indicates the azimuth of said objects, one of said prisms being adjustable to alternately direct into said same field of view images of objects on the ground, means for producing also in said field of view an image of a reference means for correlating the apparent motion of the ground objects thereagainst to determine drift, and a rotatable prism for reflecting the light rays in said field of view in any horizontal direction.

13. In an instrument wherein a compass having a movable compass card is employed for measuring the azimuth of objects, the combination with said compass, of an optical system mounted for rotation about a vertical axis passing through the center of said card, and comprising a mirror adapted to be swung about a horizontal axis, a pair of reflecting prisms for directing reflected rays from said mirror parallel and adjacent to light rays emanating from said compass card, one of said prisms being rotatable about a horizontal axis so that it may receive rays from objects on the ground, an object lens between said prisms, reference means also located between said prisms, a field lens through which are seen images of the first object, the compass card, the ground objects and the reference means whereby the bearing is determined from the first two images and the drift of an aircraft carrying the instrument is determined from the second two images, all of said images in any horizontal direction through said field lens, and means for indicating the angle of drift.

14. In combination a circular scale, a reference means, an optical system including adjustable means for combining, alternately, in the same field of view images of two objects, respectively, with images of the scale and reference means, said system including a lens having a focal length substantially equal to the radius of the scale.

RUTGER B. COLT.